United States Patent
Yabe et al.

(10) Patent No.: US 11,517,990 B2
(45) Date of Patent: Dec. 6, 2022

(54) MACHINE TOOL

(71) Applicants: CITIZEN WATCH CO., LTD., Nishitokyo (JP); CITIZEN MACHINERY CO., LTD., Kitasaku-gun Nagano (JP)

(72) Inventors: Koichi Yabe, Tokorozawa (JP); Yosuke Ando, Kokubunji (JP); Yosuke Wada, Kawagoe (JP); Wataru Katagishi, Osaki (JP)

(73) Assignees: CITIZEN WATCH CO., LTD., Nishitokyo (JP); CITIZEN MACHINERY CO., LTD., Kitasaku-gun Nagano (JP)

( * ) Notice: Subject to any disclaimer, the term of this patent is extended or adjusted under 35 U.S.C. 154(b) by 152 days.

(21) Appl. No.: 16/755,882

(22) PCT Filed: Oct. 3, 2018

(86) PCT No.: PCT/JP2018/037105
§ 371 (c)(1),
(2) Date: Apr. 14, 2020

(87) PCT Pub. No.: WO2019/087667
PCT Pub. Date: May 9, 2019

(65) Prior Publication Data
US 2021/0086320 A1 Mar. 25, 2021

(30) Foreign Application Priority Data
Oct. 31, 2017 (JP) .............................. JP2017-211261

(51) Int. Cl.
*B23Q 11/12* (2006.01)

(52) U.S. Cl.
CPC ... *B23Q 11/127* (2013.01); *Y10T 409/303976* (2015.01); *Y10T 409/309352* (2015.01)

(58) Field of Classification Search
CPC ... B23Q 11/126; B23Q 11/127; B23Q 11/128; Y10T 409/303976; Y10T 409/304088;
(Continued)

(56) References Cited

U.S. PATENT DOCUMENTS

| 4,133,230 A | * | 1/1979 | Inaba | ....................... B23Q 5/10 82/142 |
| 4,178,834 A | * | 12/1979 | Holmstrom | ........ B23Q 11/0021 408/1 R |

(Continued)

FOREIGN PATENT DOCUMENTS

| CH | 360262 A | * | 2/1962 | ........... B23Q 11/127 |
| CN | 201693189 U | * | 1/2011 | |

(Continued)

OTHER PUBLICATIONS

Definition of "At"; The Random House College Dictionary Revised Edition (Year: 1982).*

(Continued)

*Primary Examiner* — Boyer D Ashley
*Assistant Examiner* — Michael Vitale
(74) *Attorney, Agent, or Firm* — Kenja IP Law PC

(57) ABSTRACT

A machine tool (1) includes a spindle (32) supported on a support surface (37a) of a support body (37) with such an orientation that the longitudinal axis of the spindle extends along the support surface (37a). The spindle (32) is movable in a vertical direction that is perpendicular to the longitudinal axis of the spindle (32). The support body (37) is provided with a ventilation hole (80) extending through the support body (37) between the support surface (37a) and a surface (37b) facing in the direction opposite to the support surface (37a), to open toward the spindle (32).

4 Claims, 3 Drawing Sheets

(58) Field of Classification Search
CPC ....... Y10T 409/309352; Y10T 82/2552; Y10T 82/90
USPC ................ 310/60 A, 63; 409/135, 137, 231; 82/142, 900
See application file for complete search history.

(56) References Cited

U.S. PATENT DOCUMENTS

| | | | | |
|---|---|---|---|---|
| 4,226,561 | A | * | 10/1980 | Ramusino ............... B23C 1/027 409/232 |
| 4,580,471 | A | * | 4/1986 | Oyama ................... B23Q 5/10 310/90 |
| 5,027,527 | A | * | 7/1991 | Dorris .................... G05D 23/20 33/783 |
| 5,062,330 | A | * | 11/1991 | Trautmann ............. B23B 9/005 310/90 |
| 5,213,019 | A | * | 5/1993 | Carlyle ................ B23Q 11/128 384/900 |
| 5,944,643 | A | * | 8/1999 | Koelblin ............ B23Q 3/15706 483/55 |
| 7,185,503 | B2 | * | 3/2007 | Parpajola ............. B23Q 11/128 409/135 |
| 2006/0291971 | A1 | * | 12/2006 | Tanoue .................. B23Q 3/069 409/202 |
| 2008/0213057 | A1 | * | 9/2008 | Betschon ................. B23C 3/18 409/165 |
| 2009/0136312 | A1 | * | 5/2009 | Grossmann ............ B23Q 1/015 29/27 C |
| 2018/0264612 | A1 | * | 9/2018 | Chang ................. B23Q 11/128 |

FOREIGN PATENT DOCUMENTS

| | | | |
|---|---|---|---|
| CN | 201807743 | U * | 4/2011 |
| CN | 102744428 | A | 10/2012 |
| JP | S52108588 | A | 9/1977 |
| JP | S60178535 | U | 11/1985 |
| JP | H04193454 | A | 7/1992 |
| JP | H10512815 | A | 12/1998 |
| JP | 3293242 | B2 | 6/2002 |
| WO | 2011132314 | A1 | 10/2011 |

OTHER PUBLICATIONS

May 5, 2020, International Preliminary Report on Patentability issued in the International Patent Application No. PCT/JP2018/037105.
Sep. 17, 2021, Office Action issued by the Taiwan Intellectual Property Office in the corresponding Taiwanese Patent Application No. 107135260.
May 8, 2021, Office Action issued by the China National Intellectual Property Administration in the corresponding Chinese Patent Application No. 201880065994.1.
May 11, 2021, Notification of Reasons for Refusal issued by the Japan Patent Office in the corresponding Japanese Patent Application No. 2017-211261.
Jan. 15, 2019, International Search Report issued in the International Patent Application No. PCT/JP2018/037105.
Nov. 5, 2021, Office Action issued by the China National Intellectual Property Administration in the corresponding Chinese Patent Application No. 201880065994.1.
Mar. 29, 2022, Office Action issued by the China National Intellectual Property Administration in the corresponding Chinese Patent Application No. 201880065994.1.

* cited by examiner

MACHINE TOOL

TECHNICAL FIELD

This disclosure relates to a machine tool, such as a lathe.

BACKGROUND

In the state of the art, there is known a machine tool, such as a lathe, with a configuration wherein, for allowing a plurality of types of processing to be carried out with respect to a workpiece held on a spindle, the spindle is movable not only in the axial direction (Z-axis direction), but also in the vertical direction (Y-axis direction).

For example, JPS 52-108588 A1 (PTL 1) describes a machine tool with a configuration wherein the spindle is cantilevered on a side surface of a support with the axis oriented in the horizontal direction, and is made movable vertically along the side surface of the support, such that various types of processing can be carried out with respect to a workpiece held on the spindle also on surfaces other than the surface including the axis.

On the other hand, a machine tool is generally provided with a structure or device for cooling the spindle and the like.

For example, JP 3293242 B (PTL 2) describes a machine tool wherein the spindle is fixedly supported on the upper surface of the support, and the support is provided with a cooling structure in the form of ventilation hole that extends through the support between the side surface and the upper surface and opens toward the spindle for cooling the spindle by blowing air from the lower side to the upper side of the spindle through the ventilation hole.

CITATION LIST

Patent Literature

PTL 1: JPS 52-108588 A1
PTL 2: JP 3293242 B

SUMMARY

Technical Problem

In a conventional machine tool with a spindle that can be moved not only in the axial direction but also in the vertical direction, there is provided a moving mechanism around the spindle for moving the spindle in the vertical direction. However, it is difficult to secure a space for installing the structure or device for cooling the spindle. This means that, if a structure or device for cooling the spindle is provided, there arises a problem that a machine tool is increased in size.

The present disclosure has been made in view of the abovementioned problems, and it is an object of the present disclosure to provide a machine tool having a cooling structure capable of cooling the spindle without increasing the size of the machine tool.

Solution to the Problem

The machine tool according to the present disclosure includes a spindle supported on a support surface of a support body with such an orientation that a longitudinal axis of the spindle extends along the support surface, and the spindle is movable in a vertical direction that is along the support surface and perpendicular to the longitudinal axis, wherein the support body is provided with a ventilation hole extending through the support body between the support surface and a surface facing in the direction opposite to the support surface, to open toward the spindle.

Preferably, the machine tool of the present disclosure with the configuration as described above is provided with a moving mechanism on the support surface side of the support body, for allowing the spindle to move vertically relative to the support surface.

Preferably, the machine tool of the present disclosure with the configuration as described above further comprises a blower for forcibly flowing air through the ventilation hole.

Advantageous Effect

According to the present disclosure, it is possible to realize a machine tool with a cooling structure for cooling a spindle, without enlarging the machine tool.

DETAILED DESCRIPTION

Figure 1:
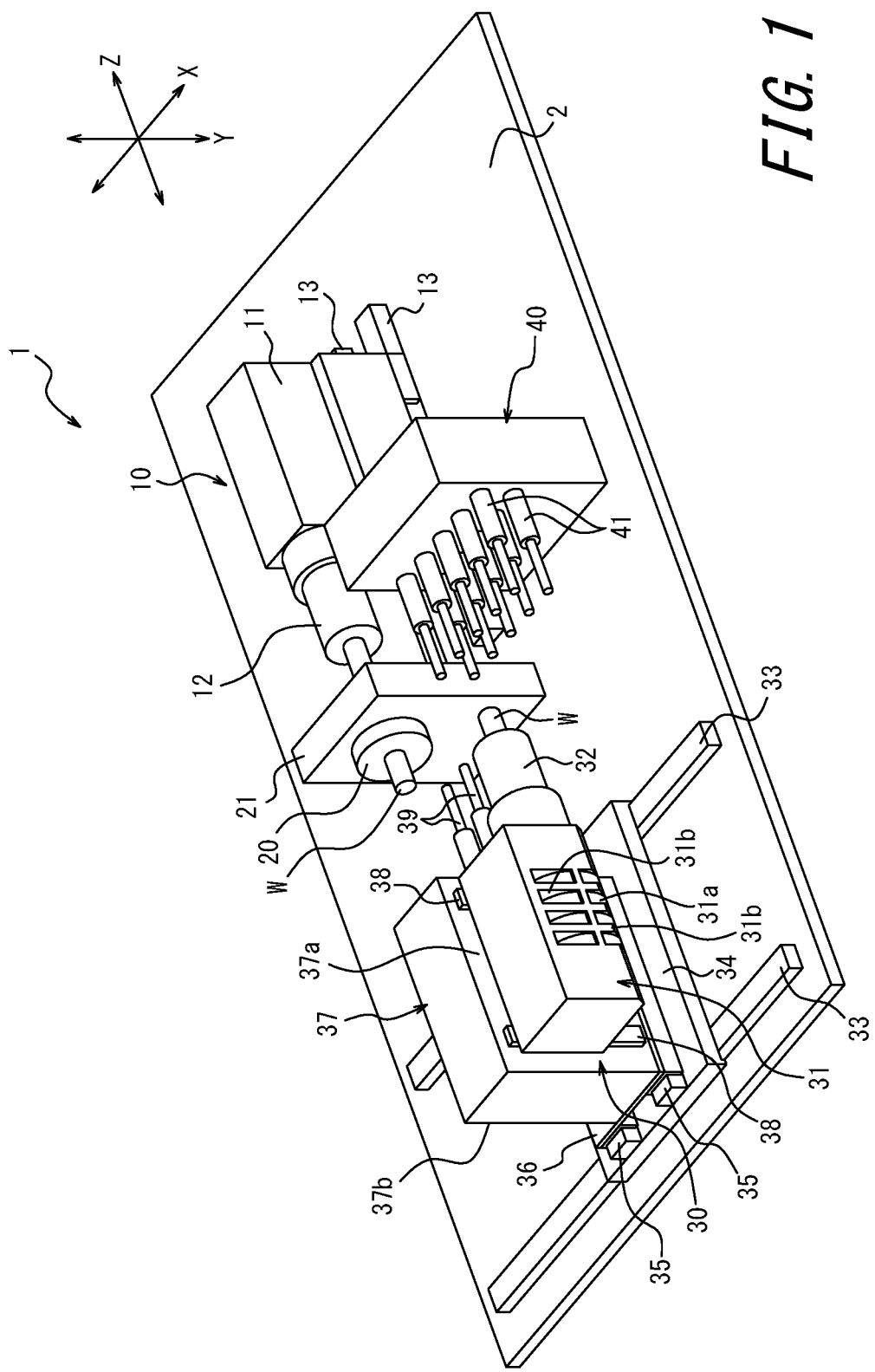
FIG. 1 is a perspective view schematically illustrating a machine tool according to one embodiment of the present disclosure.

As illustrated in FIG. 1, a machine tool 1 according to an embodiment of the present disclosure is configured as a lathe for carrying out cutting process (turning) on a rotating workpiece W by means of a tool. The machine tool 1 includes a base 2 with an upper surface having a front spindle unit 10, a guide bush 20, a rear spindle unit 30, and a rear tool stand 40.

The front spindle unit 10 includes a front headstock 11 and a front spindle 12 rotatably supported by the front headstock 11. The front spindle 12 is arranged with an orientation wherein the axis is parallel (horizontal) to the upper surface of the base 2.

The front spindle 12 is formed in a hollow shape adapted to move an elongate rod-shaped workpiece W inserted from the rear end side of the front headstock 11 along the axis and is adapted to hold the workpiece W by means of a chuck. The front headstock 11 incorporates a drive source, such as a built-in electric motor, such that the front spindle 12 can be driven by the drive source to rotate the workpiece W.

A pair of front Z-axis rails 13 are provided on the upper surface of the base 2 and extend in a direction parallel to the axis of the front spindle 12. The front headstock 11 is slidably supported by these front Z-axis rails 13. The front headstock 11 can be driven by a driving device including, for example, a ball screw mechanism, and thereby moved along the front Z-axis rail 13. By moving the front headstock 11 along the front Z-axis rail 13, the front spindle 12 can be moved in the Z-axis direction along the axis.

The guide bush 20 is supported by a bush support 21 fixedly secured to the base 2 and is arranged such that its axis coincides with the axis of the front spindle 12. The front end portion of the workpiece W protruding from the front end of the front spindle 12 extends through the guide bush 20, and is supported and guided by the guide bush 20.

The machine tool 1 may have a configuration without the guide bush 20.

The rear spindle unit 30 includes a rear headstock 31 and a rear spindle 32 rotatably supported by the rear headstock 31. The rear spindle 32 is arranged to face the front spindle 12 with a posture wherein the axis is parallel (horizontal) to the axis of the front spindle 12.

The rear spindle 32 receives the workpiece W from the front spindle 12 in a state where the axis is aligned with the front spindle 12 and is adapted to hold the workpiece W by means of a chuck. The rear headstock 31 incorporates a drive source, such as a built-in electric motor, such that the rear spindle 32 can be driven by the drive source to rotate the workpiece W.

A pair of rear X-axis rails 33 are provided on the upper surface of the base 2 and extend in a direction (X-axis direction) that is horizontal and perpendicular to the axis of the rear spindle 32. An X-axis slide table 34 is slidably supported on the rear X-axis rails 33. The X-axis slide table 34 can be driven by a driving device D1 (see FIG. 2) including, for example, a ball screw mechanism, and thereby moved along the rear X-axis rails 33. By moving the X-axis slide table 34 along the rear X-axis rails 33, the rear spindle 32 can be moved in the X-axis direction.

A pair of rear Z-rails 35 are provided on the upper surface of the X-axis slide table 34 and extend in the Z-axis direction parallel to the axis of the rear spindle 32. A Z-axis slide table 36 is slidably supported on the rear Z-rails 35. The Z-axis slide table 36 can be driven by a driving device D2 (see FIG. 2) including, for example, a ball screw mechanism, and thereby moved along the rear Z-axis rail 35. By moving the Z-axis slide table 36 along the rear Z-rails 35, the rear spindle 32 can be moved in the Z-axis direction.

A support body 37 is fixedly secured to the upper surface of the Z-axis slide table 36. The support body 37 is formed in a wall shape extending along the Z-axis direction, such that one side surface facing the X-axis direction constitutes a support surface 37a. The support surface 37a is parallel to the axis of the rear spindle 32.

The support surface 37a is provided with a pair of rear Y-rails 38 extending vertically (in the Y-axis direction). The rear headstock 31 is slidably supported by the rear Y-axis rail 38. Since the rear headstock 31 is supported by the rear Y-rails 38 provided on the support surface 37a, the rear spindle 32 assumes an orientation extending along the support surface 37a and is supported by the support surface 37a of the support body 37 via the rear headstock 31 and the rear Y-axis rails 38.

The rear headstock 31 can be driven by a driving device D3 (see FIGS. 2 and 3) having, for example, a ball screw mechanism, and thereby moved along the rear Y-rail 38. By moving the rear headstock 31 along the rear Y-rail 38, the rear spindle 32 can be moved in the Y-axis direction, which is the vertical direction extending along the support surface 37a and is perpendicular to the axis of the rear spindle 32.

As described above, the rear spindle 32 is movable in the Y-axis direction, in addition to the X-axis direction and the Z-axis direction.

A front headstock 31c is fixedly secured to the rear headstock 31, and a front surface processing tool 39 is installed on the front tool stand 31c. The front surface processing tool 39 protrudes toward the front spindle 12 and can be used for cutting the workpiece W held on the front spindle 12. The front surface processing tool 39 is movable in three directions, i.e., the X-axis direction, the Y-axis direction, and the Z-axis direction, together with the rear spindle 32.

The number and arrangement of the front surface processing tools 39 installed on the rear headstock 31 via the front tool stand 31c may be changed in various manners, for example, in plural numbers in the X-axis direction or the Y-axis direction, or in plural numbers in the Y-axis.

The rear tool stand 40 is fixedly secured to the upper surface of the base 2 adjacent to the front headstock unit 10 in the X-axis direction. A plurality of rear surface processing tools 41 are provided on a surface of the rear tool stand 40 facing the rear spindle unit 30. In FIG. 1, for the sake of convenience, only one of the upper rear surface processing tools 41 and one of the lower rear surface processing tools 41 are denoted by reference numerals. Each rear surface processing tool 41 protrudes toward the rear spindle 32 and may be used for cutting the workpiece W held on the rear spindle 32. These rear surface processing tool 41 may be configured as a rotary tool that can be rotationally driven, for example, by a drive source built in the rear tool stand 40.

The number and arrangement of the rear surface processing tools 41 installed on the rear tool stand 40 may be changed in various manner. A further rear tool stand may be provided on the upper surface of the base 2.

The machine tool 1 includes a drive source for rotationally driving the front spindle 12, a drive source for rotationally driving the rear spindle 32, drive device for moving the front spindle 12 in the X-axis direction, three drive devices D1 to D3 for moving the rear spindle 32 in the X-axis direction, Y-axis direction and Z-axis direction, respectively, and a control unit, such as an NC control device, known per se, for carrying out an integral control of a feed device for the workpiece W, and the like, and thereby controlling the rotation of the front spindle 12, the rotation of the rear spindle 32, the position of the front spindle 12, and the position of the rear spindle 32. By integrally controlling each of the above-described devices by means of the control unit, a plurality of types of cutting process can be carried out on the workpiece W.

For example, the front surface side of the workpiece W may be cut by moving the rear headstock 31 to thereby arrange one of the front surface processing tools 39 coaxially with the workpiece W held by the front spindle 12, and rotating the front main spindle 12 at a predetermined rotation speed while moving it in the Z-axis direction. Furthermore, the rear surface side of the workpiece W may be cut by moving the rear headstock 31 to thereby arrange the workpiece W held by the rear spindle 32 coaxially with any of the rear surface processing tools 41 installed on the rear tool stand 40, and rotating the rear spindle 32 at a predetermined rotation speed while moving it in the Z-axis direction while rotating at a speed.

Figure 2:
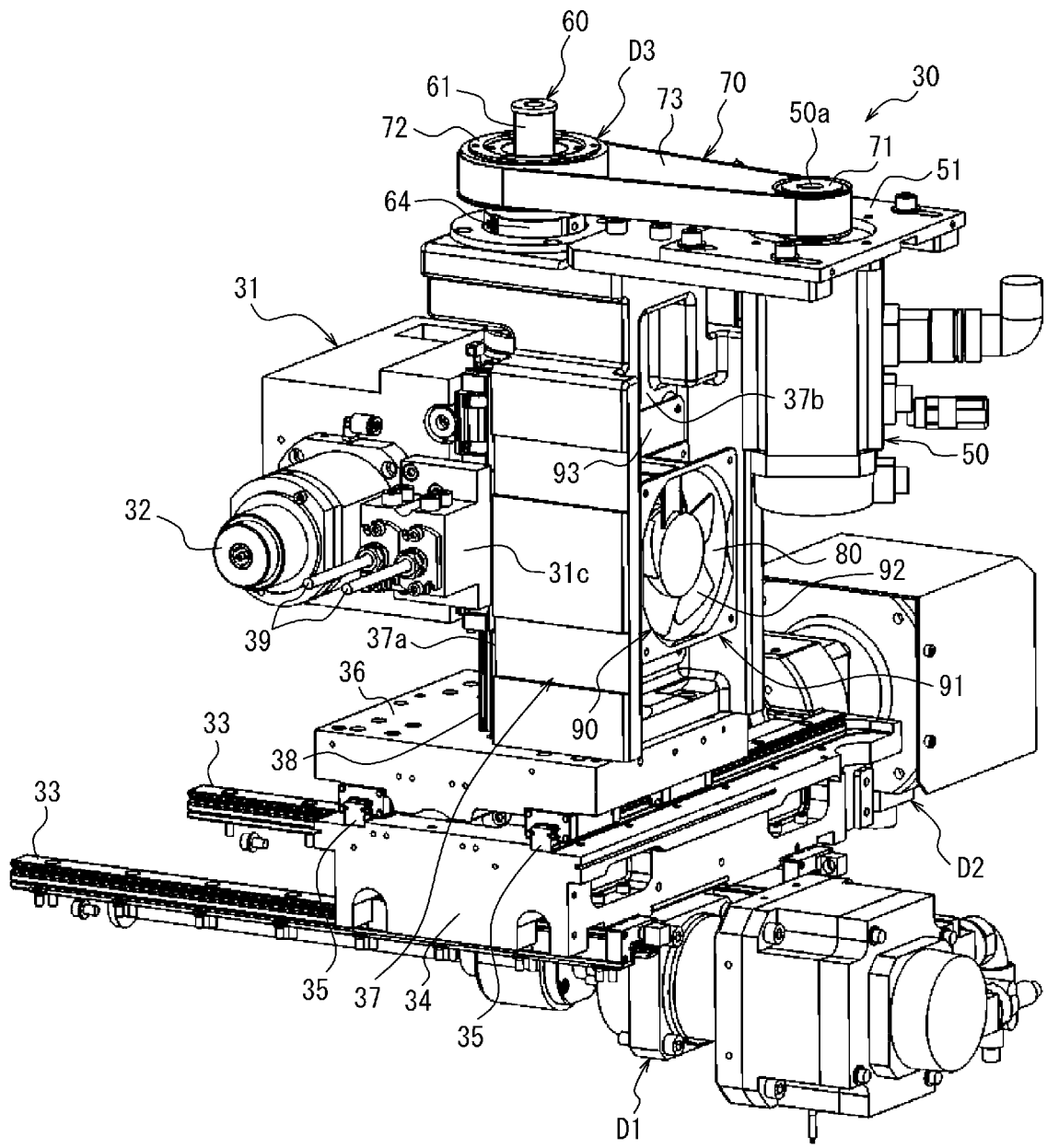
FIG. 2 is a perspective view illustrating a detailed structure of the rear spindle unit illustrated in FIG. 1.
Figure 3:
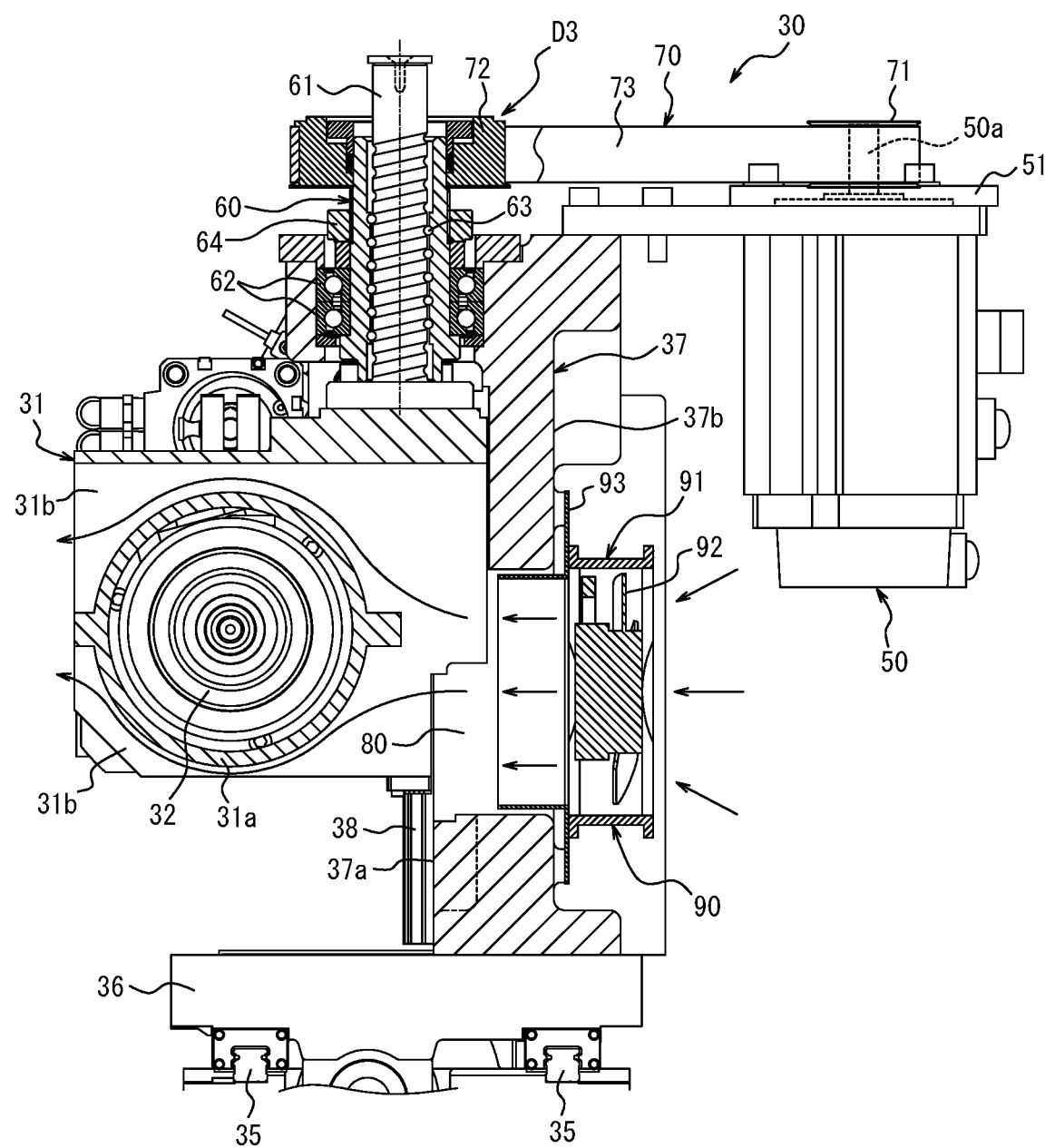
FIG. 3 is a longitudinal sectional view of the rear spindle unit illustrated in FIG. 2.

As illustrated in FIGS. 2 and 3, the driving device D3 for driving the rear spindle 32 supported by the rear headstock 31 in the vertical direction includes an electric motor 50, a ball/screw mechanism 60, and a pulley mechanism 70.

The electric motor 50 is supported by a frame 51 fixedly secured to the upper end of the support body 37, with the output shaft 50a facing upward, and spaced from a surface 37b of the support body 37 opposite to the support surface 37a.

The ball/screw mechanism 60 includes a male screw portion 61 fixedly secured to the upper surface of the rear headstock 31 and projecting upright in parallel with the Y-axis direction, and a nut portion 64 rotatably supported by the support body 37 through a pair of bearings 62 and threadedly engaged with the male screw portion 61 through a number of balls 63. The nut portion 64 supported by the support body 37 is restricted from moving in the vertical direction.

The pulley mechanism 70 may include an output pulley 71 fixedly secured to the output shaft 50a of the electric motor 50 and rotating together with the output shaft 50a, an input pulley 72 fixed to the nut 64 and rotating together with the nut 64, as well as a belt 73 stretched between the input pulley 72 and the output pulley 71, and is adapted to transmit the rotation of the output shaft 50a to the nut portion 64.

When the electric motor 50 is operated, the rotation of the output shaft 50a is transmitted to the nut portion 64 via the pulley mechanism 70, and the rotation of the nut portion 64 causes the male screw portion 61 to move in the vertical direction. Thereby, the rear headstock 31, hence the rear spindle 32, is driven in the vertical direction by means of the driving device D3. The direction of movement of the rear headstock 31 or the rear spindle 32 is changed by switching between forward and reverse rotation of the electric motor 50.

In the present embodiment, the rear Y-axis rails 38 provided on the side of the support surface 37a of the support body 37 and the ball screw mechanism 60 constitute a moving mechanism for allowing the rear spindle 32 to be moved vertically relative to the support surface 37a of the support body 37.

The support body 37 is provided with a ventilation hole 80. The ventilation hole 80 extends through the support body 37 along the substantially horizontal direction between the support surface 37a and the opposite surface 37b. The ventilation hole 80 is opened between the pair of rear Y-axis rails 38 on the side of the support surface 37a such that the openings are directed toward the side of the rear spindle 32.

A blower 90 is attached to the support body 37 for forcing air to flow through the ventilation hole 80. The blower 90 is configured as a blower fan and includes a substantially cylindrical shroud 91 and a fan 92 arranged inside the shroud 91. The fan 92 is rotationally driven by a drive source, such as an electric motor arranged on the axis. The blower 90 is fixedly secured to a flange portion 93 provided on the opposite surface 37b of the support body 37 with a bolt or the like, such that the blower 90 is arranged at an opening on the side of the opposite surface 37 of the ventilation hole 80. The shroud 91 is partly inserted into the ventilation hole 80.

When the blower 90 is operated, a flow of air is forcibly generated in the ventilation hole 80 from the opposite surface 37b of the support body 37 toward the support surface 37a. Thus, cooling air flows from the opposite surface 37b of the support body 37, through the ventilation hole 80, and toward the rear spindle 32 inside the rear headstock 31, thereby allowing cooling of the rear spindle 32.

The rear headstock 31 includes a cylindrical portion 31a covering the outer periphery of the rear spindle 32, and a plurality of fin-shaped heat sinks (radiator plates) 31b are integrally provided on the outer peripheral surface of the cylindrical portion 31a.

The cooling air flowing from the ventilation holes 80 toward the inside of the rear headstock 31 impinges the cylindrical portion 31a or the heat sink 31b, such that the rear headstock 31 or the rear spindle 32 is cooled through the cylindrical portion 31a or the heat sink 31b. By cooling the rear headstock 31 or the rear spindle 32, it is possible to prevent the problem due to the heat on the side of the rear spindle 32, besides that the thermal displacement of the machine tool due to the heat from the rear headstock 31 or the rear spindle 32 is suppressed, thereby preventing lowering of the processing accuracy of the workpiece W held on the rear spindle 32.

The moving stroke of the rear headstock 31 or the rear spindle 32 in the Y-axis direction and the size of the ventilation hole 80 are determined such that the cooling air always flows toward the inside of the rear headstock 31 at any position of the rear headstock 31 or the rear spindle 32 within the range of the moving stroke in the Y-axis direction.

As described above, in the machine tool 1 according to the present embodiment, the support body 37 is configured such that the rear spindle 32 supported by the support surface 37a of the support body 37 is vertically movable along the support surface 37a, and the ventilation hole 80 is provided to extend through the support body 37 between the support surface 37a and the opposite surface 37b and open toward the rear spindle 32 such that the rear spindle 32 is cooled by the cooling air flowing through the ventilation holes 80. The rear spindle 32 can thus be cooled without providing a cooling device such as a cooling water jacket or a large-scale cooling structure. Therefore, it is possible to realize a small-sized machine tool 1 capable of cooling the rear spindle 32 without increase in size of the machine tool 1.

In the machine tool 1 according to the present embodiment, the cooling air flowing from the ventilation hole 80 toward the inside of the rear headstock 31 serves to cool not only the rear headstock 31 or the rear spindle 32, but the moving mechanism as well, i.e., the rear Y-axis rail 38 and the ball screw mechanism 60 arranged on the side of the support surface 37a of the support body 37. In other words, both the rear spindle 32 and the moving mechanism can be cooled by the cooling air from the ventilation holes 80.

For example, the configuration may be such that the rear Y-axis rails 38 and the ball screw mechanism 60 are cooled directly or indirectly by the cooling air through the ventilation hole 80, or such that the rear Y-axis rail 38 and the ball screw mechanism 60 are cooled indirectly via the support body 37 or the rear headstock 31 that, in turn, have already been cooled by the cooling air from the ventilation hole 80.

Since the rear Y-axis rails 38 and the ball screw mechanism 60 are cooled by the cooling air from the ventilation holes 80, it is possible to suppress thermal displacement of the rear Y-axis rail 38 or the ball screw mechanism 60, and prevent occurrence of positioning control error of the rear headstock 31 or the rear spindle 32. Therefore, it is possible to prevent lowering of the processing accuracy of the workpiece W held on the rear spindle 32.

The present disclosure is not limited to the embodiment described above and may be modified in various manners without departing from the scope of the invention.

In the embodiment described above, the ventilation hole 80 is provided in the support body 37, which supports the rear spindle 32 movably in the vertical direction, in order to cool the rear spindle 32, though the ventilation hole may be provided in the support with the front spindle 12 vertically movable by the support, in order to cooling the front spindle 12.

In the embodiment described above, the machine tool 1 is configured to have the front spindle 12 and the rear spindle 32, though it may be configured to have a single spindle. In this instance, the single spindle is supported by the support movably in the vertical direction and the spindle is cooled by the ventilation holes provided in the support.

In the embodiment described above, a blower having a substantially cylindrical shroud 91 and a fan 92 arranged inside the shroud 91 is used as the blower 90, through there may be used a blower with other configurations provided that wind can be forcibly flown through the ventilation hole 80.

In the embodiment described above, the blower 90 is arranged at the opening on the side of the opposite surface 37*b* of the ventilation hole 80. However, the location of the blower may be changed in various manners, insofar as wind can be forced to flow through the ventilation hole 80. For example, the blower may be arranged inside the ventilation hole 80.

In the embodiment described above, the wind is forced to flow from the side of the opposite surface 37*b* to the ventilation hole 80 toward the side of the support surface 37*a*, though the wind may be forced to flow from the side of the support surface 37*a* to the side of the opposite surface 37*b* toward the ventilation hole 80. In this instance, due to the negative pressure generated in the ventilation hole 80, air is forced to flow from the side of the rear spindle 32 to the ventilation hole 80, thereby cooling the rear spindle 32.

The configuration may be such that, instead of providing the blower 90, air is forced to flow through the ventilation holes 80 by convection due to heating of the air around the rear spindle 32 by the heat of the rear spindle 32.

The configuration of the moving mechanism or the driving device D3 for moving the rear spindle 32 in the vertical direction, and the configurations of the other driving devices D1 and D2 may be changed in various manners.

REFERENCE SIGNS LIST

1 Machine tool
2 Base
10 Front spindle unit
11 Front headstock
12 Front spindle
13 Front Z-axis rail
20 Guide bush
21 Bushing support
30 Rear spindle unit
31 Rear headstock
31*a* Cylindrical part
31*b* Heat sink
31*c* Front tool stand
32 Rear spindle
33 Rear X-axis rail
34 X-axis slide table
35 Rear Z-axis rail
36 Z-axis slide table
37 Support body
37*a* Support surface
37*b* Opposite surface
38 Rear Y-axis rail (moving mechanism)
39 Front surface processing tool
40 Rear tool stand
41 Rear surface processing tool
50 Electric motor
50*a* Output shaft
51 Frame
60 Ball screw mechanism (moving mechanism)
61 Male screw portion
62 Bearing
63 Ball
64 Nut
70 Pulley mechanism
71 Output pulley
72 Input side pulley
73 Belt
80 Ventilation holes
90 Blower
91 Shroud
92 Fan
93 Flange portion
W Workpiece
D1 Driving device
D2 Driving device
D3 Driving device

The invention claimed is:

1. A machine tool comprising:
a headstock,
a spindle rotatably supported by the headstock,
a support body having a support surface that supports the headstock and an opposite surface that is located opposite to the support surface, and
a moving mechanism disposed on the support surface of the support body, for moving the headstock vertically relative to the support surface, wherein
the spindle has a longitudinal axis that extends along the support surface,
the spindle is movable in a vertical direction, the vertical direction being disposed along the support surface and extending perpendicular to the longitudinal axis,
the support body having a ventilation hole that extends from the opposite surface, through the support body, to the support surface, to open toward the spindle, wherein
the machine tool further comprises a blower that is arranged at the opposite surface to forcibly flow air through the ventilation hole, and
the blower is arranged upstream of the ventilation hole in terms of cooling airflow.

2. The machine tool according to claim 1, wherein the spindle holds a workpiece that is to be cut.

3. The machine tool according to claim 2, wherein the machine tool further comprises a tool stand on which a plurality of processing tools for cutting the workpiece are supported.

4. The machine tool according to claim 3, wherein the processing tools are configured as rotary tools.

\* \* \* \* \*